US009776499B2

(12) United States Patent
Nam et al.

(10) Patent No.: US 9,776,499 B2
(45) Date of Patent: Oct. 3, 2017

(54) COOLING SYSTEM FOR VEHICLE

(71) Applicant: Hyundai Motor Company, Seoul (KR)

(72) Inventors: Jongwoo Nam, Seoul (KR); Hanshin Chung, Yongin-si (KR); Joonho Lee, Seoul (KR); Hyun Cho, Seoul (KR)

(73) Assignee: Hyundai Motor Company, Seoul (KR)

(*) Notice: Subject to any disclaimer, the term of this patent is extended or adjusted under 35 U.S.C. 154(b) by 282 days.

(21) Appl. No.: 14/551,032

(22) Filed: Nov. 23, 2014

(65) Prior Publication Data

US 2015/0322845 A1 Nov. 12, 2015

(30) Foreign Application Priority Data

May 8, 2014 (KR) .................. 10-2014-0055060

(51) Int. Cl.
*F01P 9/02* (2006.01)
*B60K 11/04* (2006.01)
*F01P 9/06* (2006.01)
*F01P 3/20* (2006.01)
*B60T 5/00* (2006.01)
(Continued)

(52) U.S. Cl.
CPC ............. *B60K 11/04* (2013.01); *B60K 11/08* (2013.01); *B60K 11/085* (2013.01); *B60T 5/00* (2013.01); *B62D 37/02* (2013.01); *F01P 3/20* (2013.01); *F01P 9/06* (2013.01); *F02B 29/0443* (2013.01); *F16D 65/807* (2013.01); *F16D 65/827* (2013.01); *F16D 65/847* (2013.01); *Y02T 10/146* (2013.01); *Y02T 10/166* (2013.01)

(58) Field of Classification Search
USPC .......................................... 123/41.21, 41.25
See application file for complete search history.

(56) References Cited

U.S. PATENT DOCUMENTS 5,408,843 A * 4/1995 Lukas .................. B60H 1/3227
62/244
2008/0087238 A1* 4/2008 Held ....................... F01P 7/165
123/41.48

FOREIGN PATENT DOCUMENTS

JP 2006-82597 A 3/2006
JP 2006-306226 A 11/2006
(Continued)

OTHER PUBLICATIONS

Machine Translation of JP2006306226A PDF File Name: "JP2006306226A_Machine_Translation.pdf".*

Primary Examiner — Carlos A Rivera
Assistant Examiner — Ruben Picon-Feliciano
(74) Attorney, Agent, or Firm — Morgan, Lewis & Bockius LLP

(57) ABSTRACT

A cooling system for a vehicle may include at least two air ducts formed at both side of an exterior air intake port; a low temperature radiator to release heat of coolant into the air; a high temperature radiator to release heat of coolant into the air; an ancillary low temperature radiator to release heat of coolant into the air; an ancillary high temperature radiator disposed inside of another one of the at least two air duct to release heat of coolant into the air; a turbocharger; an intercooler cooling compressed air generated from the turbocharger by using coolant flowed via the low temperature radiator and the high temperature radiator; a compressor; a condenser cooling the compressed refrigerant generated from the compressor by using coolant flowed via the low temperature radiator; a high temperature coolant passage; and a low temperature coolant passage.

14 Claims, 13 Drawing Sheets

(51) Int. Cl.
    *F16D 65/807*    (2006.01)
    *F16D 65/827*    (2006.01)
    *F16D 65/847*    (2006.01)
    *B60K 11/08*     (2006.01)
    *B62D 37/02*     (2006.01)
    *F02B 29/04*     (2006.01)

(56) References Cited

FOREIGN PATENT DOCUMENTS

| | | | |
|---|---|---|---|
| JP | 2006306226 A | * | 11/2006 |
| JP | 4083545 B2 | | 2/2008 |
| JP | 5240444 B2 | | 4/2013 |
| KR | 10-2011-0061216 A | | 6/2011 |
| KR | 10-2012-0127761 A | | 11/2012 |
| KR | 10-2013-0065176 A | | 6/2013 |
| KR | 10-2013-0049999 A | | 7/2013 |

\* cited by examiner

COOLING SYSTEM FOR VEHICLE

CROSS-REFERENCE TO RELATED APPLICATION

The present application claims priority to and the benefit of Korean Patent Application No. 10-2014-0055060 filed on May 8, 2014, the entire contents of which is incorporated herein for all purposes by this reference.

BACKGROUND OF THE INVENTION

Field of the Invention

The present invention relates to a cooling system for a vehicle. More particularly, the present invention relates to a cooling system for a vehicle which is adapted that cooling performance and aerodynamic performance are improved.

Description of Related Art a method for keeping temperature of an engine and a method for cooling an engine are provided for a vehicle.

Meanwhile, an air duct is a passage through which air passes, and is a pipe for guiding air to parts requiring air from a part through which air can easily flow inside.

For example, there are an air duct that guides air to be sucked into an engine and an air duct for cooling a brake system.

Recently, techniques for preserving temperature of an engine and minimizing fuel consumption at the time of initial starting of the engine have been actively developed.

However, cooling of an engine may not be performed well, fuel consumption may be deteriorated during high speed driving, and heat damage may be generated to components which are disposed to a periphery of an exhaust passage at a high temperature if only the method for preserving temperature of an engine is performed. In addition, the performance of cooling an engine and fuel consumption may be deteriorated, and the heat damage may be become serious if air flowing through a radiator grille is interfered with by ancillary machinery disposed to the periphery of an engine.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a cooling system for a vehicle having advantages of improving cooling performance.

In addition, various aspects of the present invention are directed to providing a cooling system for a vehicle a further advantage of improving aerodynamic performance by countervailing interference of a vehicle body, ancillary machinery, a wheel, and so on against air flow.

In aspect of the present invention, a cooling system for a vehicle may include at least two air ducts formed at both side of an exterior air intake port to take in exterior air in front of the vehicle to an engine compartment and configured to take in the exterior air in the front of the vehicle such that the exterior air is flowed out toward a wheel, a low temperature radiator disposed at the exterior air intake port and configured to release heat of coolant into the air, a high temperature radiator disposed at the exterior air intake port and configured to release heat of coolant into the air, an ancillary low temperature radiator disposed inside of one of the at least two air ducts and configured to release heat of coolant into the air, an ancillary high temperature radiator disposed inside of another one of the at least two air duct and configured to release heat of coolant into the air, a turbocharger generating compressed air for supplying to an engine, an intercooler cooling compressed air generated from the turbocharger by using coolant flowed via the low temperature radiator and the high temperature radiator, a compressor generating compressed refrigerant for supplying to an air conditioner, a condenser cooling the compressed refrigerant generated from the compressor by using coolant flowed via the low temperature radiator, a high temperature coolant passage disposed such that coolant passing through the high temperature radiator is circulated to the high temperature radiator via the engine, and a low temperature coolant passage disposed such that coolant passing through the low temperature radiator is passed through a water-cooled type condenser and is circulated again to the low temperature radiator.

The both rear ducts are gradually more bent to be respectively headed for wheels toward a rear direction of the vehicle.

A guide plate which guides a direction of air flow such that air flow is guided toward the wheel is provided to duct outlet.

The guide plate guides a direction of air flow such that air flowed out through the duct outlet forms an air curtain in front of the wheel such that air forming the air curtain in front of the wheel is directed by a set angle for maximizing an effect of the air curtain at the side surface of the wheel.

A low temperature radiator is disposed between a front duct and a rear duct, and the low temperature radiator is cooled by air flowing via the front duct and the rear duct passes therein.

Coolant flowing via the ancillary low temperature radiator and the ancillary high temperature radiator heat-exchanges with air passing through the air duct in which the ancillary low temperature radiator and the ancillary high temperature radiator are respectively disposed.

The intercooler and the condenser are disposed near the engine at rearward of the exterior air intake port.

The low temperature coolant passage may include a first low temperature coolant passage connecting the intercooler with the condenser, a second low temperature coolant passage connecting the intercooler with the ancillary low temperature radiator, a third low temperature coolant passage connecting the low temperature radiator with the condenser, and a fourth low temperature coolant passage branched from the third low temperature coolant passage between the ancillary low temperature radiator and the low temperature radiator to be connected with a first valve which is disposed on the second low temperature coolant passage, wherein the first valve controls such that coolant flowing through the fourth low temperature coolant passage via the first low temperature coolant passage selectively flows through the second low temperature coolant passage.

The high temperature coolant passage may include a first high temperature coolant passage transmitting coolant passing through the high temperature radiator to the engine, a second high temperature coolant passage transmitting coolant passing through the engine to the high temperature radiator, a third high temperature coolant passage branched from the second high temperature coolant passage to be connected with the ancillary high temperature radiator and connected again with the second high temperature coolant passage, and a fourth high temperature coolant passage branched from the first high temperature coolant passage and connected on the second high temperature coolant passage via the intercooler.

A second valve which controls such that coolant flowing through the second high temperature coolant passage is selectively flows through the third high temperature coolant passage is disposed at a portion that the third high temperature coolant passage is branched on the second high temperature coolant passage.

The second valve is disposed at a portion that the fourth high temperature coolant passage is connected on the second high temperature coolant passage and is operated such that coolant selectively flows through the fourth high temperature coolant passage.

The cooling system may further include at least one thermoelectric generator which performs thermoelectric generation using temperature difference between coolant passing through the low temperature radiator and refrigerant passing through the condenser.

The cooling system may further include at least one thermoelectric generator which performs thermoelectric generation using temperature difference between coolant passing through the low temperature radiator and coolant passing through the high temperature radiator.

The cooling system may further include an air flap which selectively opens/closes the exterior air intake port.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
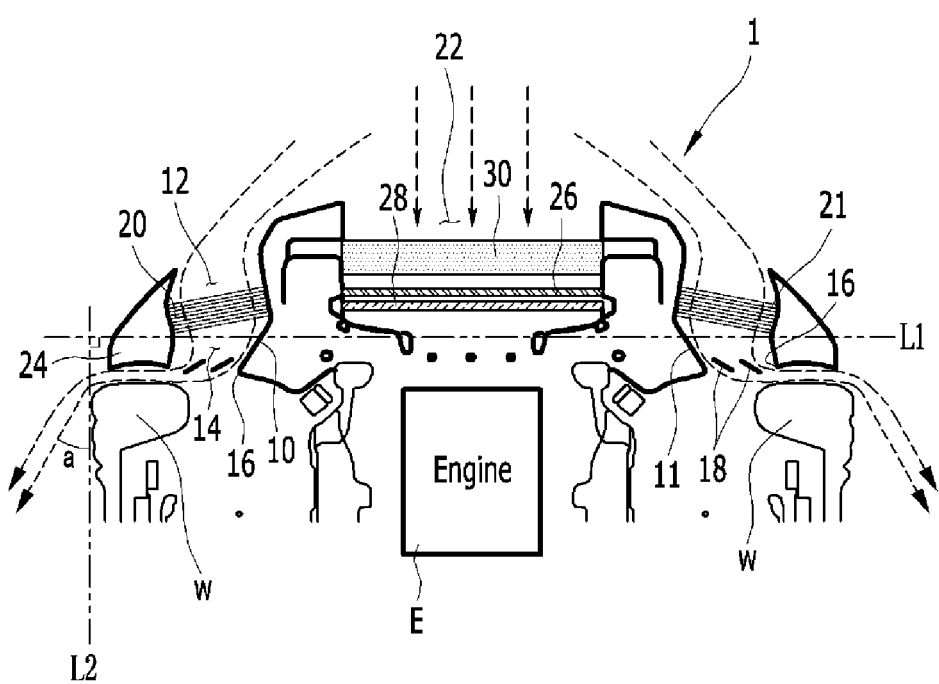
FIG. 1 is a schematic diagram of a cooling system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a schematic diagram of a cooling system according to an exemplary embodiment of the present invention.

As shown in FIG. 1, a cooling system 1 for a vehicle according to an exemplary embodiment of the present invention includes an exterior air intake port 22 and an air duct 10 and 11.

The exterior air intake port 22 is an air passage which receives exterior air in front of a vehicle to flow into an engine compartment through a radiator grille.

Air passing through the exterior air intake port 22 cools an intercooler 30, a low temperature radiator 26, and a high temperature radiator 28, and flows into the engine compartment. That is, the intercooler 30, the low temperature radiator 26, and the high temperature radiator 28 are disposed at the exterior air intake port 22. Herein, the intercooler 30 is an apparatus for cooling air which flows into a turbocharger 32, the high temperature radiator 28 is an apparatus for releasing heat of high temperature coolant flowed via an engine E into the air, and the low temperature radiator 26 is an apparatus for releasing remaining heat of low temperature coolant by separately providing with the high temperature radiator 28. In addition, the turbocharger 32 is configured to drive turbine by inhaling exhaust gas or exterior air and supply compressed air having a high temperature to cylinders of the engine E for increasing output of the engine E. Further, when air density becomes high, intake efficiency of the cylinder, combustion efficiency, and fuel efficiency of the engine are improved, and carbon dioxide production is simultaneously decreased as the intercooler 30 cools the high temperature air compressed by the turbocharger 32.

For vehicle, the intercooler 30, the low temperature radiator 26, the high temperature radiator 28, and the turbocharger 32 are well-known to a person of an ordinary skill in the art, so a detailed description thereof will be omitted.

The air ducts 10 and 11 are formed at both sides of the exterior air intake port 22. That is, the cooling system 1 includes at least two air ducts 10 and 11. FIG. 1 shows two air ducts 10 and 11. Herein, one of the two air ducts 10 and 11 will be called "first air duct 10", and the other one of the two air ducts 10 and 11 will be called "second air duct 11".

The first and second air ducts 10 and 11 respectively have a front duct 12, a rear duct 14, and a duct outlet 16.

The front duct 12 is a portion which is formed relatively forward of the first and second air ducts 10 and 11 to take in exterior air in front of a vehicle. In addition, the front duct 12 is formed to become gradually more bent to the inside of the vehicle toward the front direction of a vehicle such that an extension line of the front duct 12 of the first air duct 10 and an extension line of the front duct 12 of the second air duct 11 form a streamlined shape in front of the vehicle. Further, as the front duct 12 forms a streamlined shape, resistance of the air may be minimized. Therefore, the front duct 12 can smoothly take in exterior air in front of a vehicle at both sides of the exterior air intake port 22. That is, aerodynamic performance of air passing through the front duct 12 is improved.

The rear duct 14 is a portion which is formed relatively rearward at the first and second air ducts 10 and 11 such that air flowed via the front duct 12 passes therein. In addition, the rear duct 14 is formed to become gradually more bent to the outside of a vehicle toward the rear direction of the vehicle such that an extension line of the rear duct 14 of the first air duct 10 and an extension line of the rear duct 14 of the second air duct 11 form a streamlined shape in front of the vehicle. Further, the rear duct 14 bent to the outside of the vehicle is directed to a wheel W. That is, the rear duct 14 minimizes resistance of the air and guides air flow toward the wheel W. Herein, the wheel W is naturally a front wheel.

The duct outlet 16 is formed such that air flowing via the rear duct 14 passes therein. in addition, the duct outlet 16 is adapted such that air flows out from the first and second air ducts 10 and 11. Further, a guide plate 18 disposed at the duct outlet 16 to guide air flow toward the wheel W.

The guide plate 18 guides a flow direction of air flowing out through the duct outlet 16. The duct outlet 16 is integrally formed with a wheel well 24. That is, the guide plate 18 is mounted at the wheel well 24. Herein, the wheel well 24 is a part of a vehicle body to be housing which covers the wheel W.

The guide plate 18 guides a flow direction of the air such that air flowed out through the duct outlet 16 forms an air curtain in front of the wheel W. In addition, the guide plate 18 is provided such that the air which forms the air curtain in front of the wheel W is directed by a set angle (a) to the side surface of the wheel W. Further, the set angle (a) may predetermined for maximizing effect of an air curtain by a person of ordinary skill in the art.

In FIG. 1, a width direction adjoint line L1 and a length direction adjoint line L2 of the vehicle body are illustrated for visually showing the set angle (a) at which air is directed to the side surface of the wheel W. In other words, FIG. 1 shows that the width direction adjoint line L1 of the vehicle body perpendicularly crosses the length direction adjoint line L2 of the vehicle body and the direction to which air is directed to the side surface of the wheel W and the length direction adjoint line L2 forms an included angle being the set angle (a).

A low temperature radiator 20 and 21 may be further disposed in the interior of the first and second air ducts 10 and 11 respectively. In addition, the low temperature radiator 20 and 21 which is respectively disposed inside of the first and second air ducts 10 and 11 performs cooling function by using air passing through the first and second air ducts 10 and 11. Herein, the low temperature radiator 20 and 21 which is respectively disposed inside of the first and second air ducts 10 and 11 is an apparatus for releasing remaining heat of low temperature coolant by separately providing with the high temperature radiator 28 such as the low temperature radiator 26 which is disposed at the exterior air intake port 22. Meanwhile, one of ancillary radiators 20 and 21 disposed inside of the first and second air ducts 10 and 11 is the ancillary low temperature radiator 20 which cools coolant passing through the low temperature radiator 26, and the other one of ancillary radiators 20 and 21 is the ancillary high temperature radiator 21 which cools coolant passing through the high temperature radiator 28.

Meanwhile, the intercooler 30 is a water-cooled type or an air-cooled type according to the type of cooling. As described above, the intercooler 30 is an air-cooled type.

In case that the air-cooled type intercooler 30 is disposed in front of the engine E, it is cooled first by exterior air. Therefore, cooling efficiency of the intercooler 30 can be improved at a low speed low load of the engine E such that the engine E cooling and reactivity of the intercooler 30 are not required very much. On the other hand, in a high load state of the engine E, the engine cooling performance may be deteriorated as flow of exterior air is disturbed by interference of the intercooler 30. Particularly, responsiveness of the intercooler 30 may be deteriorated because a length of the pipe which connects the intercooler 30 with the engine E and the turbocharger 32 is long in the high speed high load of the engine E.

Figure 2:
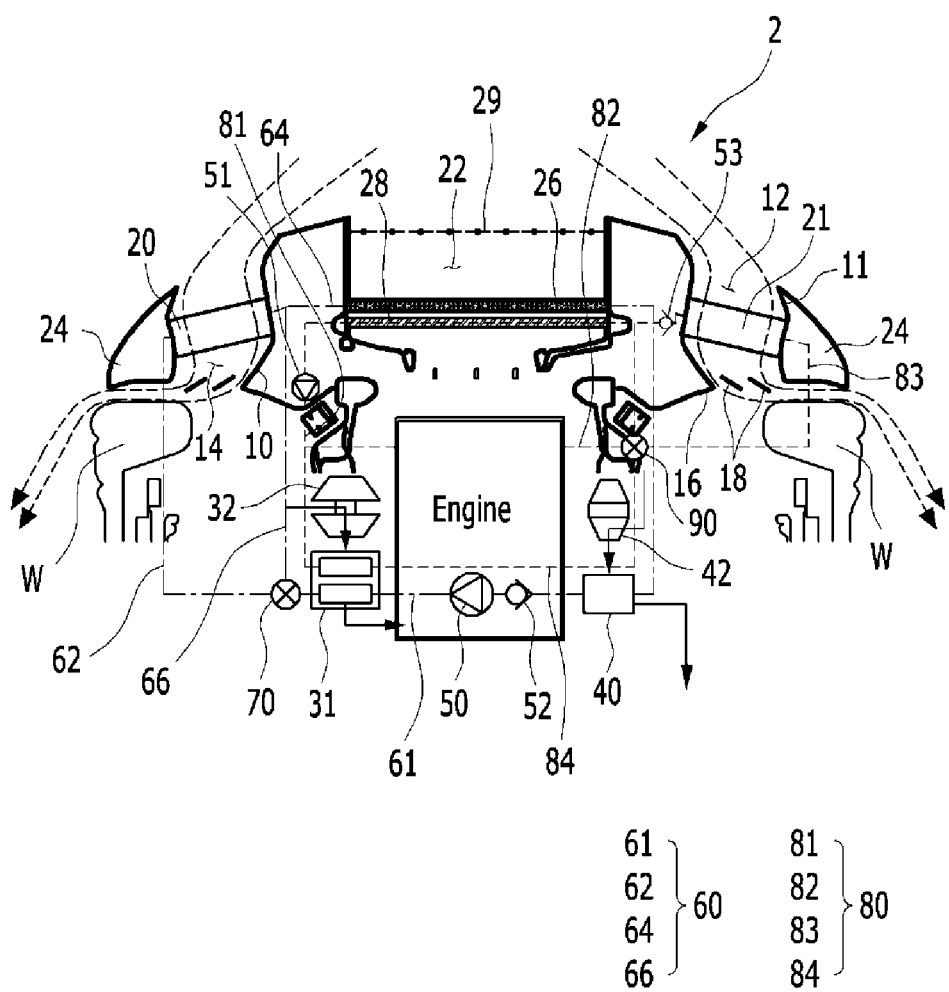
FIG. 2 is a schematic diagram of a cooling system according to another exemplary embodiment of the present invention.

FIG. 2 is a schematic diagram of a cooling system according to another exemplary embodiment of the present invention.

As shown in FIG. 2, a cooling system 2 for a vehicle according to another exemplary embodiment of the present invention includes a low temperature radiator 26, a high temperature radiator 28, air flap 29, an ancillary low temperature radiator 20, an ancillary high temperature radiator 21, a rear intercooler 31, a turbocharger 32, a rear condenser 40, a compressor 42, first and second water pumps 50 and 51, first and second check valves 52, a low temperature coolant passage 60, a high temperature coolant passage 80, and first and second valves 70 and 90.

Herein, the description regarding the low temperature radiator 26 and the high temperature radiator 28 is same to the basic constituent elements of the cooling system 1 according to an exemplary embodiment of the present invention which are described referring to FIG. 1, thus repeated descriptions will be omitted.

The air flap 29 is an apparatus for opening/closing an air passage. In addition, the air flap 29 is disposed between the radiator grille and a cooling fan, and functions to selectively close flow of air flowing into the exterior air intake port 22. Meanwhile, the low temperature radiator 26 and the high temperature radiator 28 are disposed between the air flap 29 and the cooling fan.

Air flowed via the radiator grille, the air flap 29, the low temperature radiator 26, the high temperature radiator 28, and the cooling fan cools an engine E or is supplied as intake air of an engine E when the air flap 29 opens the exterior air intake port 22. In addition, the air flap 29 which is disposed between the radiator grille and the cooling fan closes the exterior air intake port 22 in case that the engine cooling is not required. Herein, the air flap 29 may be an active air flap which is selectively opened or closed such that the engine compartment selectively receives exterior in front of a vehicle according to driving condition of an engine E.

The ancillary low temperature radiator 20 and the ancillary high temperature radiator 21 are respectively disposed inside of the first air duct 10 and the second air duct 11, and the rear intercooler 31, the turbocharger 32, the rear condenser 40, the compressor 42, and the first and second water pumps 50 and 51 are disposed at the rear of the first air duct 10 and the second air duct 11.

The ancillary low temperature radiator 20 is the low temperature radiator 20 which is disposed inside of the first air duct 10.

The ancillary high temperature radiator 21 is the high temperature radiator 21 which is disposed inside of the second air duct 11.

The rear intercooler 31 is the water-cooled type intercooler 31 which is disposed near the engine E in the rear of the first air duct 10.

The turbocharger 32 is a turbocharger 32 which is connected with the rear intercooler 31 and is positioned near the engine E.

The rear condenser 40 is the water-cooled type condenser 40 which is disposed near engine E in rear of the second air duct 11.

The compressor 42 is a compressor 42 which is connected with the rear condenser 40 and is positioned near the engine E to supply compressed refrigerant to an air conditioner. In addition, the refrigerant flowed via the compressor 42 is cooled by coolant flowing via the rear condenser 40 during the refrigerant flows via the rear condenser 40. Herein, the condenser 40 which is an apparatus for securing electrical capacity and the compressor 42 which is an apparatus for compressing air and increasing pressure are well-known to a person of an ordinary skill in the art, so a detailed description thereof will be omitted.

The first water pump 50 pumps coolant between the rear intercooler 31 and the rear condenser 40.

The first check valve 52 prevents a back flow of coolant which is pumped by the first water pump 50.

The second water pump 51 pumps coolant between the rear intercooler 31 and the high temperature radiator 28.

The second check valve 53 prevents a back flow of coolant which is pumped by the second water pump 51.

Herein, circulation of coolant which is pumped by the first water pump 50 and is flowed via the low temperature radiator 26 is performed through the low temperature coolant passage 60, and circulation of coolant which is pumped by the second water pump 51 and is flowed via the high temperature radiator 28 is performed through the high temperature coolant passage 80.

The low temperature coolant passage 60 is formed such that coolant circulates via the ancillary low temperature radiator 20, the rear intercooler 31, and the rear condenser 40 by that coolant is pumped by the first water pump 50. In addition, the low temperature coolant passage 60 includes first, second, third, and fourth low temperature coolant passage 61, 62, 64, and 66.

The first low temperature coolant passage 61 connects the rear intercooler 31 and the rear condenser 40 which are disposed near the engine E. In addition, the first water pump 50 and the check valve 52 are disposed on the first low temperature coolant passage 61.

The second low temperature coolant passage 62 connects the rear intercooler 31 and the ancillary low temperature radiator 20. In addition, the first valve 70 is disposed on the second low temperature coolant passage 62. Herein, one end of the ancillary low temperature radiator 20 which is connected with the second low temperature coolant passage 62 may be an outside portion of the ancillary low temperature radiator 20 which is positioned to be relatively close with the wheel W.

The third low temperature coolant passage 64 connects the ancillary low temperature radiator 20 and the rear condenser 40. In addition, the third low temperature coolant passage 64 is configured to be via the low temperature radiator 26 between the ancillary low temperature radiator 20 and the rear condenser 40. Herein, the other end of the ancillary low temperature radiator 20 which is connected with the third low temperature coolant passage 64 may be an inside portion of the ancillary low temperature radiator 20 which is positioned to be relatively far with the wheel W.

The fourth low temperature coolant passage 66 is branched from the third low temperature coolant passage 64 between the ancillary low temperature radiator 20 and the low temperature radiator 26 to be connected with the first valve 70 which is disposed on the second low temperature coolant passage 62. Herein, the first valve 70 is a valve which controls such that coolant flowing through the fourth low temperature coolant passage 66 via the first low temperature coolant passage 61 selectively flows through the second low temperature coolant passage 62.

The high temperature coolant passage 80 includes a first high temperature coolant passage 81 which transmits coolant passing through the high temperature radiator 28 to the engine E, a second high temperature coolant passage 82 which transmits coolant passing through the engine E to the high temperature radiator 28, a third high temperature coolant passage 83 which is branched from the second high temperature coolant passage 82 to be connected with the ancillary high temperature radiator 21 and is connected again with the second high temperature coolant passage 82, and a fourth high temperature coolant passage 84 which is branched from the first high temperature coolant passage 81 to be connected on the second high temperature coolant passage 82 via the rear intercooler 31.

A portion that the third high temperature coolant passage 83 is branched on the second high temperature coolant passage 82 is same to a portion that the fourth high temperature coolant passage 84 is connected on the second high temperature coolant passage 82, and a second valve 90 to control such that coolant flowing through the second high temperature coolant passage 82 selectively flows through the third high temperature coolant passage 83 is disposed at this portion. In addition, the second valve 90 may be operated such that coolant can flow through the fourth high temperature coolant passage 84 in case that cooling of the rear intercooler 31 is required.

The first and second valves 70 and 90 may be mechanical thermostats which are adapted that volume of wax constituent which is filled inside thereof is expanded or contracted according to temperature of coolant which is transmitted thereto or may be electrical thermostats which are operated according to control of a controller. In addition, as the first and second valves 70 and 90 may be operated for improving cooling efficiency in case that coolant respectively flowing through the low temperature coolant passage 60 and the high temperature coolant passage 80 requires additional cooling to except cooling by the low temperature radiator 26 and the high temperature radiator 28.

The second water pump 51 may be disposed on the first high temperature coolant passage 81, and the second check valve 53 may be disposed on the high temperature coolant passage 80 to prevent a back flow of coolant which is pumped by the second water pump 51.

The interior of the rear intercooler 31 is partitioned into a portion through which the first low temperature coolant passage 61 passes and a portion through which the fourth high temperature coolant passage 84 passes. That is, air inhaled by the turbocharger 32 may be cooled during sequentially passing through the portion through which the fourth high temperature coolant passage 84 passes and the portion through which the first low temperature coolant passage 61. Therefore, cooling efficiency of the rear intercooler 31 can be improved.

Referring to FIG. 3 to FIG. 10, circulation of coolant which is realized by a cooling system for a vehicle according to another exemplary embodiment of the present invention will be described in detail.

FIG. 3 to FIG. 10 illustrate operation diagrams of a cooling system according to another exemplary embodiment of the present invention. In addition, FIG. 3 to FIG. 6 show operation of the cooling system that the air flap 29 opens the exterior air intake port 22, and FIG. 7 to FIG. 10 show operation of the cooling system that the air flap 29 closes the exterior air intake port 22.

Meanwhile, FIG. 3 to FIG. 10 show flow of exterior air which is flowed into a vehicle body with dotted line arrows, and show flow of low temperature coolant with solid line arrows on the low temperature coolant passage 60 which is illustrated with short dash lines, and show flow of high temperature coolant with solid line arrows on the high temperature coolant passage 80 which is illustrated with dotted lines, and shows flow of compressed air flowing via the turbocharger 32 and the rear intercooler 31 and flow of refrigerant flowing via the compressor 42 and the rear condenser 40 with solid line arrows.

Figure 3:
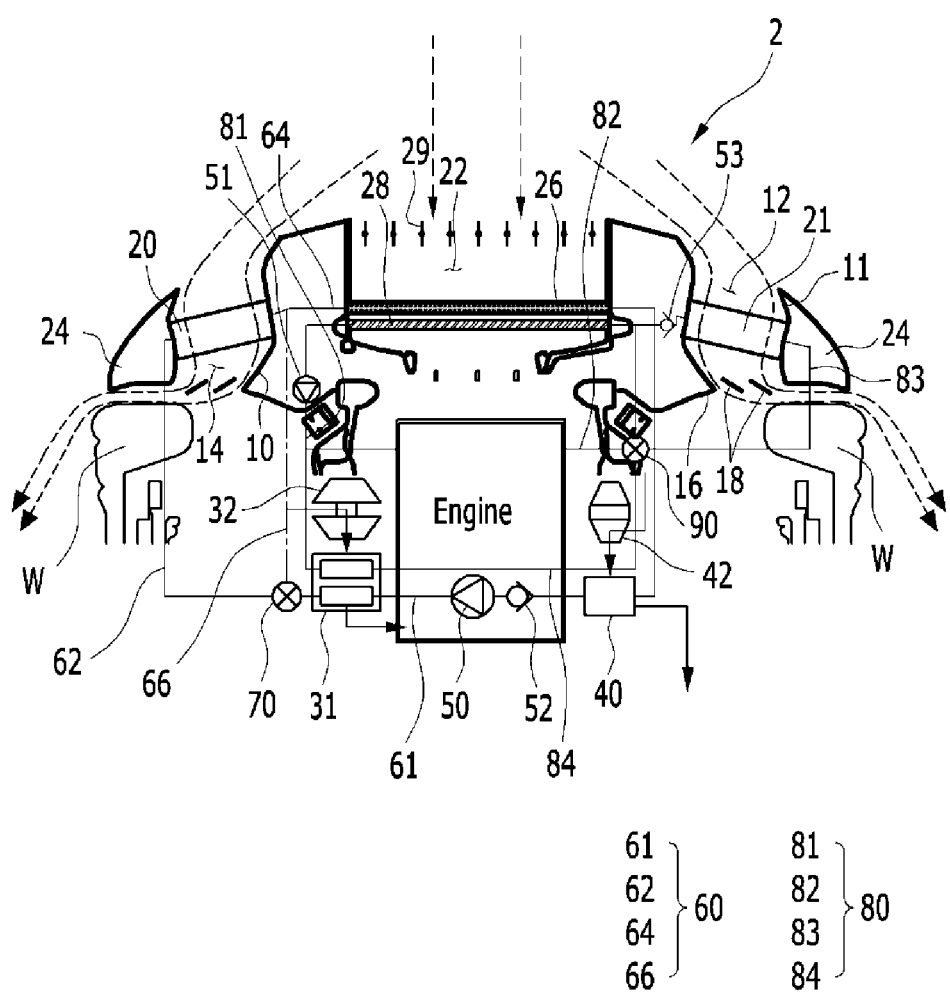
FIG. 3, FIG. 4, FIG. 5, FIG. 6, FIG. 7, FIG. 8, FIG. 9 and FIG. 10 illustrate operation diagrams of a cooling system according to another exemplary embodiment of the present invention.

As shown in FIG. 3, the first valve 70 is operated to communicate the first low temperature coolant passage 61 connecting the rear intercooler 31 and the first valve 70 with the second low temperature coolant passage 62 connecting the first valve 70 and the ancillary low temperature radiator 20 when temperature of coolant flowed into the first valve 70 is equal to or higher than a predetermined temperature on the state that the air flap 29 is opened such that exterior air passes through the exterior air intake port 22 to cool an engine E.

In addition, the second valve 90 is operated to communicate the fourth high temperature coolant passage 84 connecting the rear intercooler 31 and the second valve 90 with the third high temperature coolant passage 83 connecting the second valve 90 and the ancillary high temperature radiator 21 when temperature of coolant flowed into the second valve 90 is equal to or higher than a predetermined temperature.

Therefore, low temperature coolant circulates via the first low temperature coolant passage 61, the second low temperature coolant passage 62, and the third low temperature coolant passage 64. In addition, high temperature coolant circulates via the first, second, third, and fourth high temperature coolant passages 81, 82, 83, and 84. This case that the air flap 29 is opened and coolant is circulated to pass all constituent elements which are configured to be cooled by coolant may be the case that the load of the rear intercooler 31 and the load of the rear condenser 40 are high.

Herein, the load of the rear intercooler 31 and the load of the engine E will be described by dividing high, middle, and low. The high, middle, and low of load may be determined by a person of an ordinary skill in the art. Meanwhile, the predetermined temperature of the first valve 70 will be called "first predetermined temperature T1", and the predetermined temperature of the second valve 90 will be called "second predetermined temperature T2".

Figure 4:
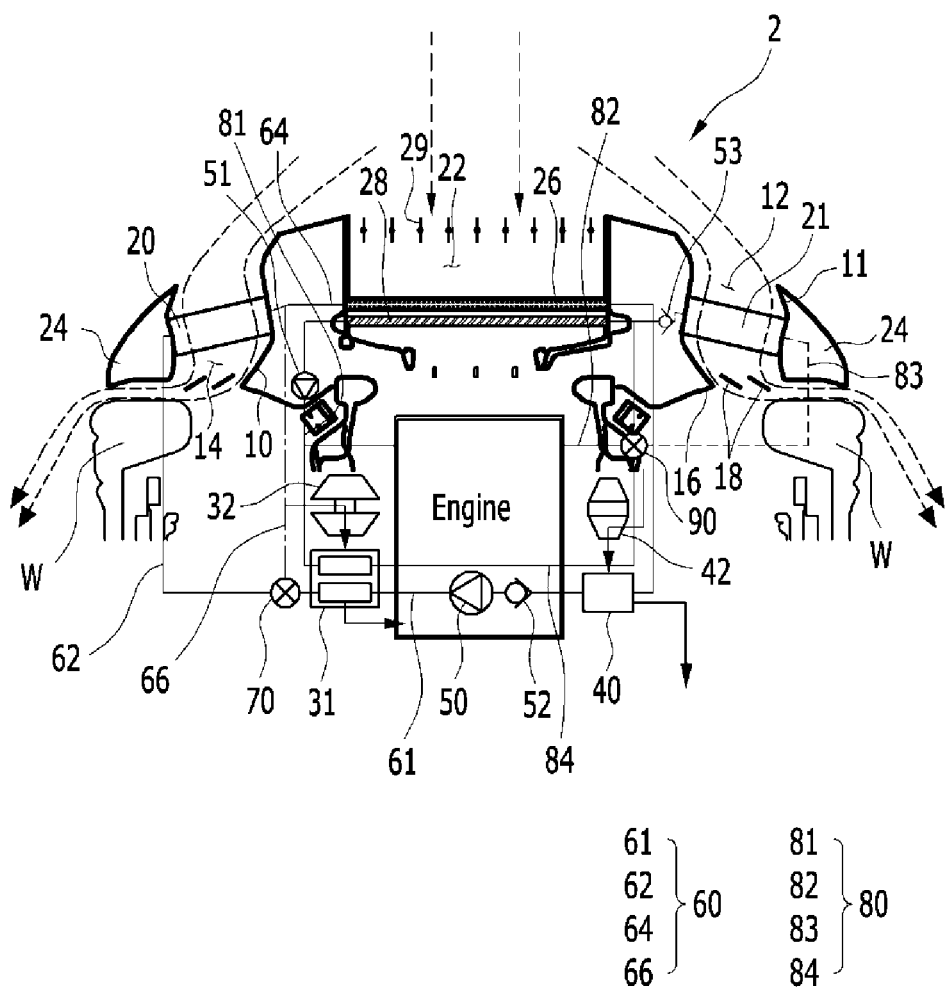

As shown in FIG. 4, the second valve 90 is operated to close communicating with the third high temperature coolant passage 83 connecting the second valve 90 and the ancillary high temperature radiator 21 when temperature of coolant flowed into the second valve 90 is lower than T2 on the state of FIG. 3.

Therefore, high temperature coolant circulates via the first, second, and fourth high temperature coolant passages 81, 82, and 84. This case that the air flap 29 is opened and high temperature coolant is circulated to skip circulating via the ancillary high temperature radiator 21 may be the case that the load of the rear intercooler 31 is high and the load of the engine E is middle.

Figure 5:
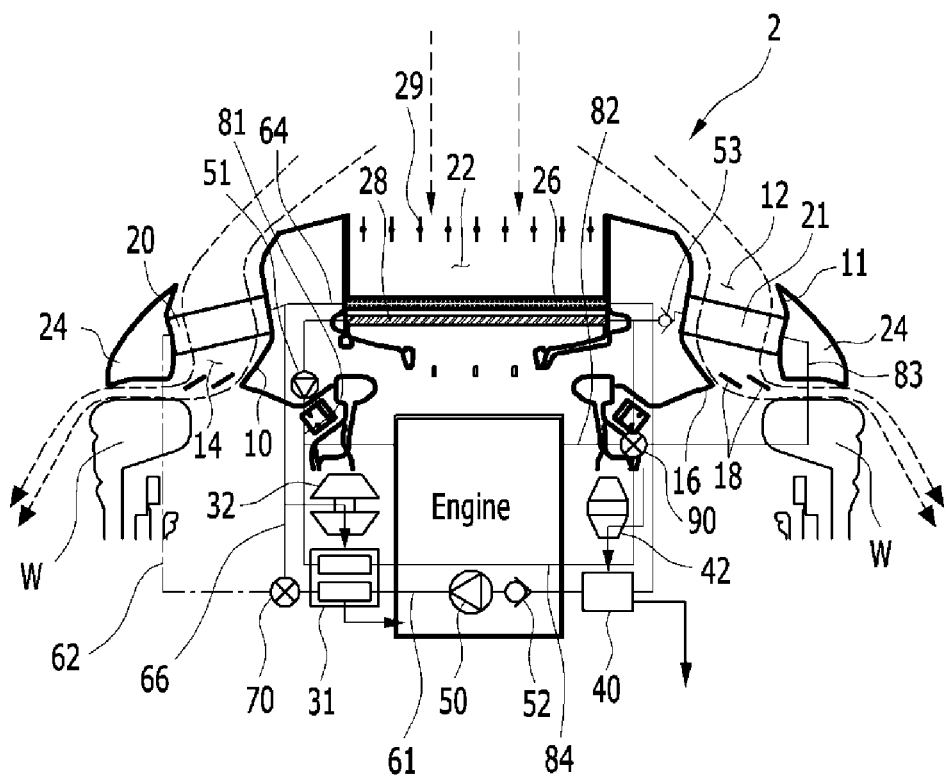

As shown in FIG. 5, the first valve 70 is operated to close communicating with the second low temperature coolant passage 62 connecting the first valve 70 and the ancillary low temperature radiator 20 and communicate the first low temperature coolant passage 61 connecting the rear intercooler 31 and the first valve 70 with the fourth low temperature coolant passage 66 when temperature of coolant flowed into the first valve 70 is lower than T1 on the state of FIG. 3.

Therefore, low temperature coolant circulates by sequentially passing through the first low temperature coolant passage 61, the fourth low temperature coolant passage 66, and the third low temperature coolant passage 64. This case that the air flap 29 is opened and low temperature coolant is circulated to skip circulating via the ancillary low temperature radiator 20 may be the case that the load of the rear intercooler 31 is middle and the load of the engine E is high.

Figure 6:
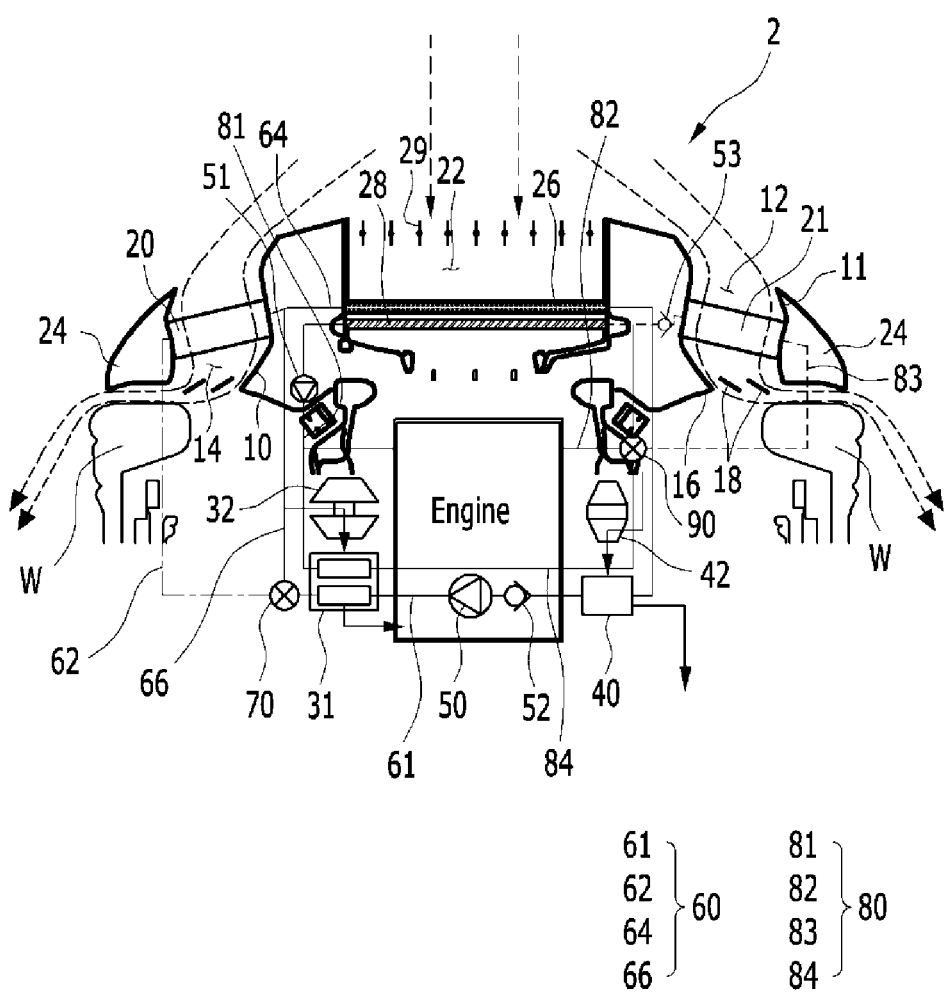

As shown in FIG. 6, the first valve 70 is operated to communicate the first low temperature coolant passage 61 connecting the rear intercooler 31 and the first valve 70 with the fourth low temperature coolant passage 66 and the second valve 90 is operated to close communicating the third high temperature coolant passage 83 connecting the second valve 90 and the ancillary high temperature radiator 21 when temperature of coolant flowed into the first valve 70 is lower than T1 and temperature of coolant flowed into the second valve 90 is simultaneously lower than T2 on the state of FIG. 3.

Therefore, low temperature coolant circulates by sequentially passing through the first low temperature coolant passage 61, the fourth low temperature coolant passage 66, and the third low temperature coolant passage 64, and high temperature coolant circulates via the first, second, and fourth high temperature coolant passages 81, 82, and 84. This case that the air flap 29 is opened, low temperature coolant is circulated to skip circulating via the ancillary low temperature radiator 20, and high temperature coolant is circulated to skip circulating via the ancillary high temperature radiator 21 may be the case that the load of the rear intercooler 31 and the load of the engine E are middle. At this time, an engine is an idle state.

Figure 7:
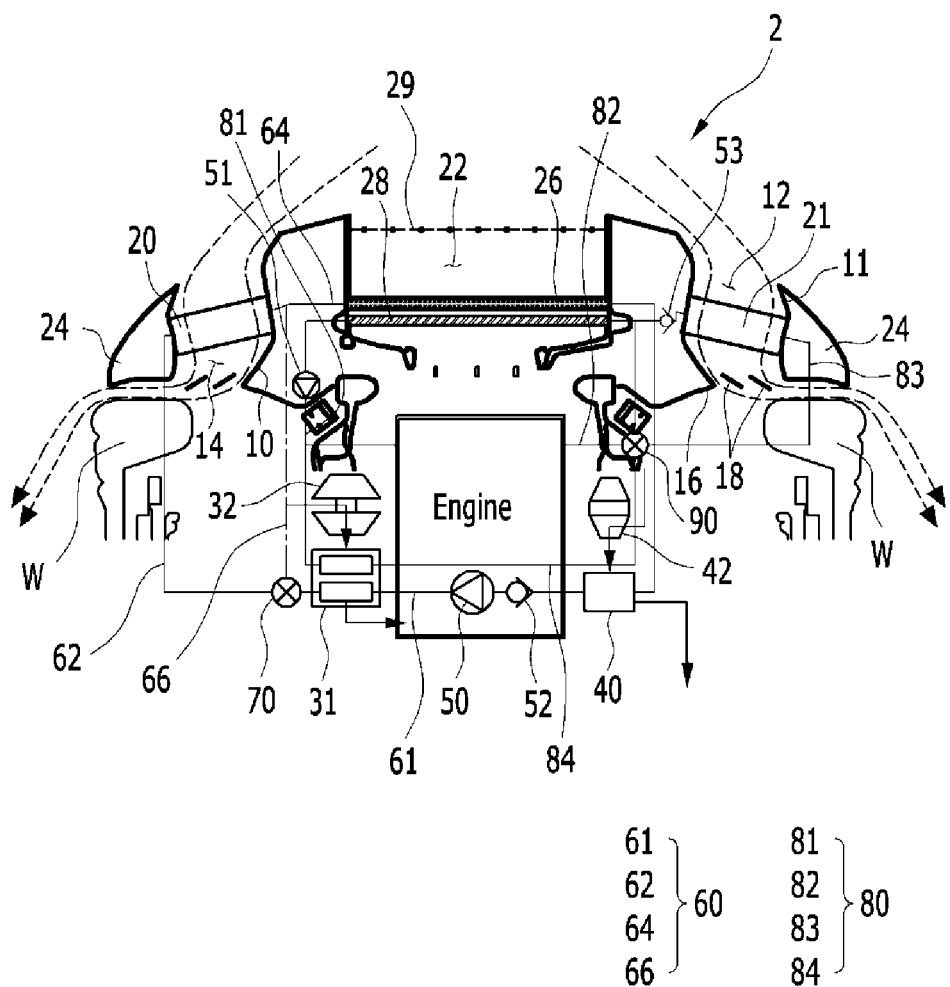

As shown in FIG. 7, the first valve 70 and the second valve 90 are equally operated with the description of FIG. 3 when temperature of coolant flowed into the first valve 70 is equal to or higher than T1 and temperature of coolant flowed into the second valve 90 is equal to or higher than T2 on the state that the air flap 29 is closed such that exterior air is not passed through the exterior air intake port 22.

Therefore, low temperature coolant circulates with sequentially passing through the first low temperature coolant passage 61, the second low temperature coolant passage 62, and the third low temperature coolant passage 64. In addition, high temperature coolant circulates via the first, second, third, and fourth high temperature coolant passages 81, 82, 83, and 84. This case that the air flap 29 is closed and coolant is circulated to pass all constituent elements which are configured to be cooled by coolant may be the case that the load of the rear intercooler 31 and the load of the engine E are middle.

Figure 8:
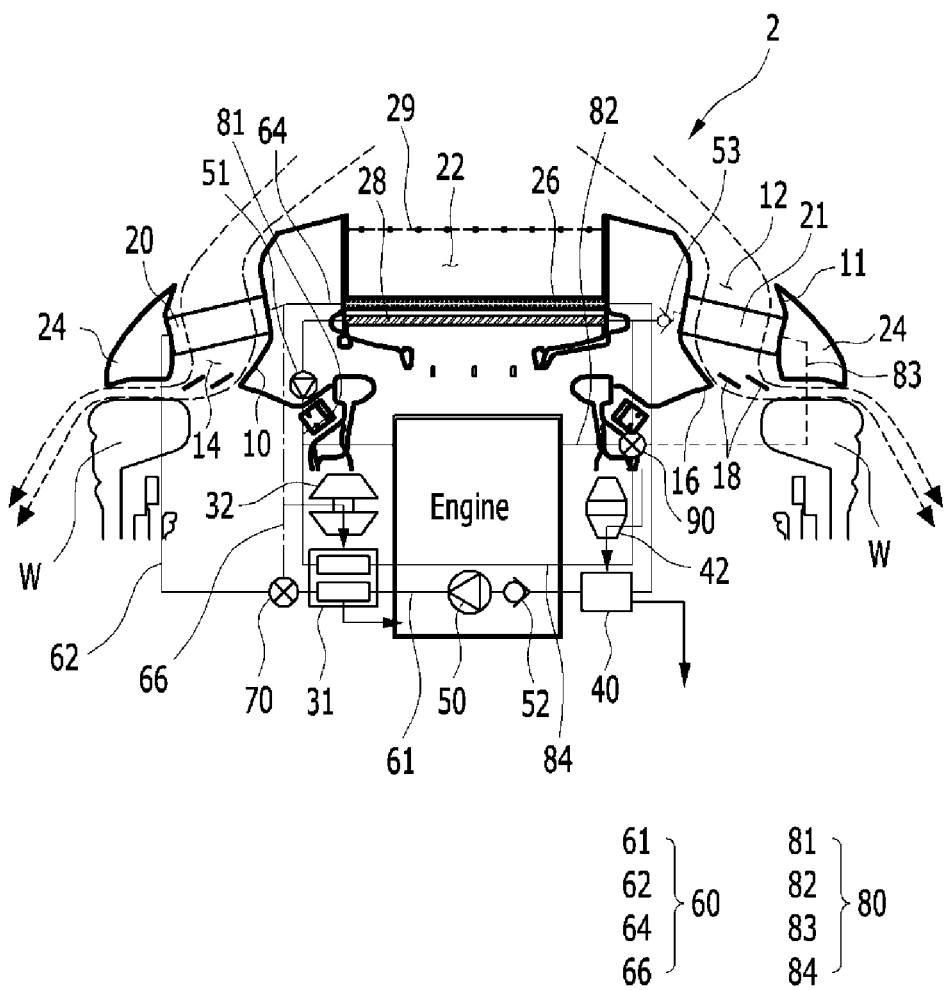

As shown in FIG. 8, the second valve 90 is equally operated with the description of FIG. 4 when temperature of coolant flowed into the second valve 90 is lower than T2 on the state of FIG. 7.

Therefore, high temperature coolant circulates via the first, second, and fourth high temperature coolant passages 81, 82, and 84. This case that the air flap 29 is closed and high temperature coolant is circulated to skip circulating via the ancillary high temperature radiator 21 may be the case that the load of the rear intercooler 31 is middle and the load of the engine E is low.

Figure 9:
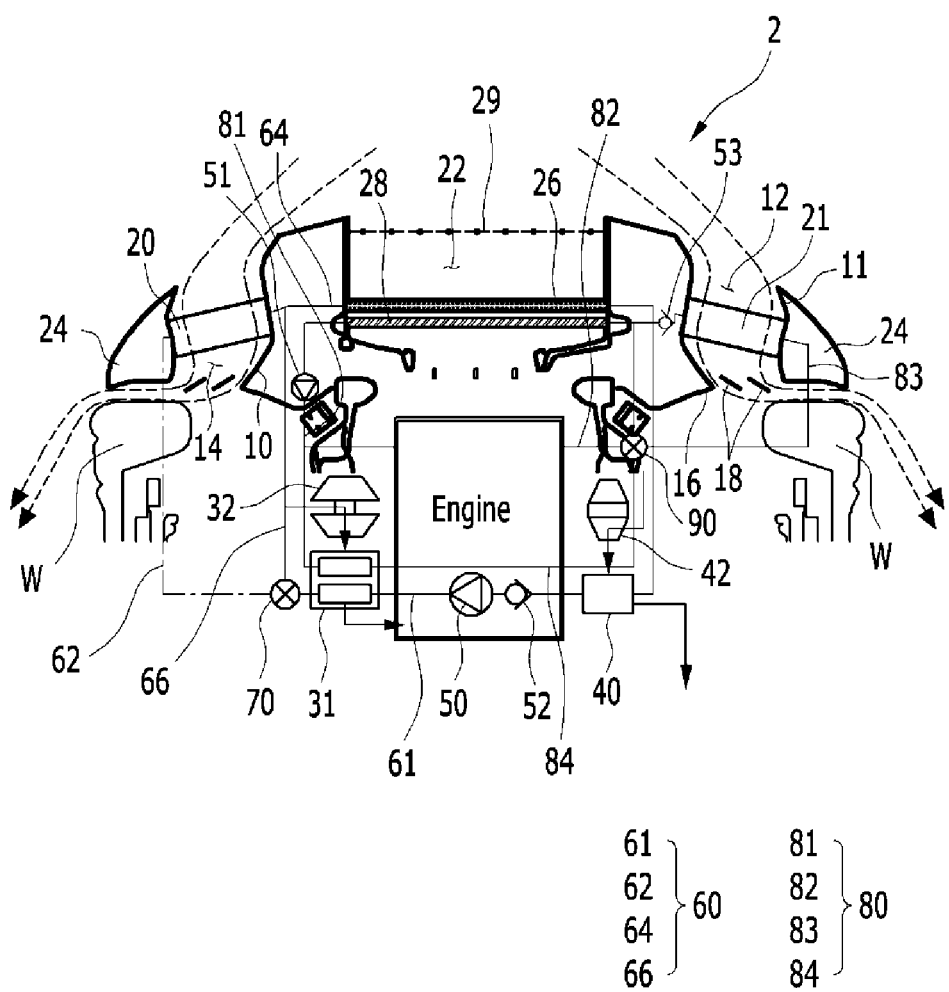

As shown in FIG. 9, the first valve 70 is equally operated with the description of FIG. 5 when temperature of coolant flowed into the first valve 70 is lower than T1 on the state of FIG. 7.

Therefore, low temperature coolant circulates with sequentially passing through the first low temperature coolant passage 61, the fourth low temperature coolant passage 66, and the third low temperature coolant passage 64. This case that the air flap 29 is closed and low temperature coolant is circulated to skip circulating via the ancillary low temperature radiator 20 may be the case that the load of the rear intercooler 31 is low and the load of the engine E is middle.

Figure 10:
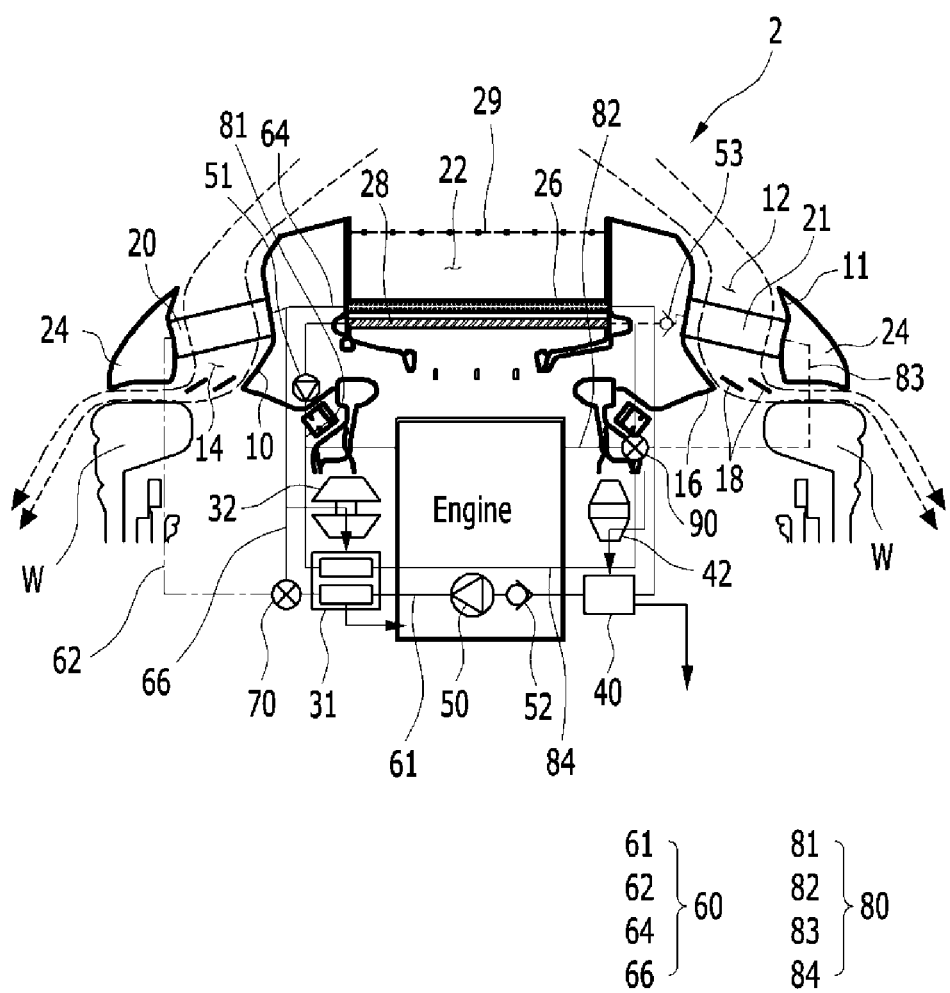

As shown in FIG. 10, the first valve 70 and the second valve 90 are equally operated with the description of FIG. 6 when temperature of coolant flowed into the first valve 70 is lower than T1 and simultaneously temperature of coolant flowed into the second valve 90 is lower than T2 on the state of FIG. 7.

Therefore, low temperature coolant circulates with sequentially passing through the first low temperature coolant passage 61, the fourth low temperature coolant passage 66, and the third low temperature coolant passage 64, and high temperature coolant circulates via the first, second, and fourth high temperature coolant passages 81, 82, and 84. This case that the air flap 29 is closed, low temperature coolant is circulated to skip circulating via the ancillary low temperature radiator 20, and high temperature coolant is circulated to skip circulating via the ancillary high temperature radiator 21 may be the case that the load of the rear intercooler 31 and the load of the engine E are low. At this time, an engine is an idle state.

Figure 11:
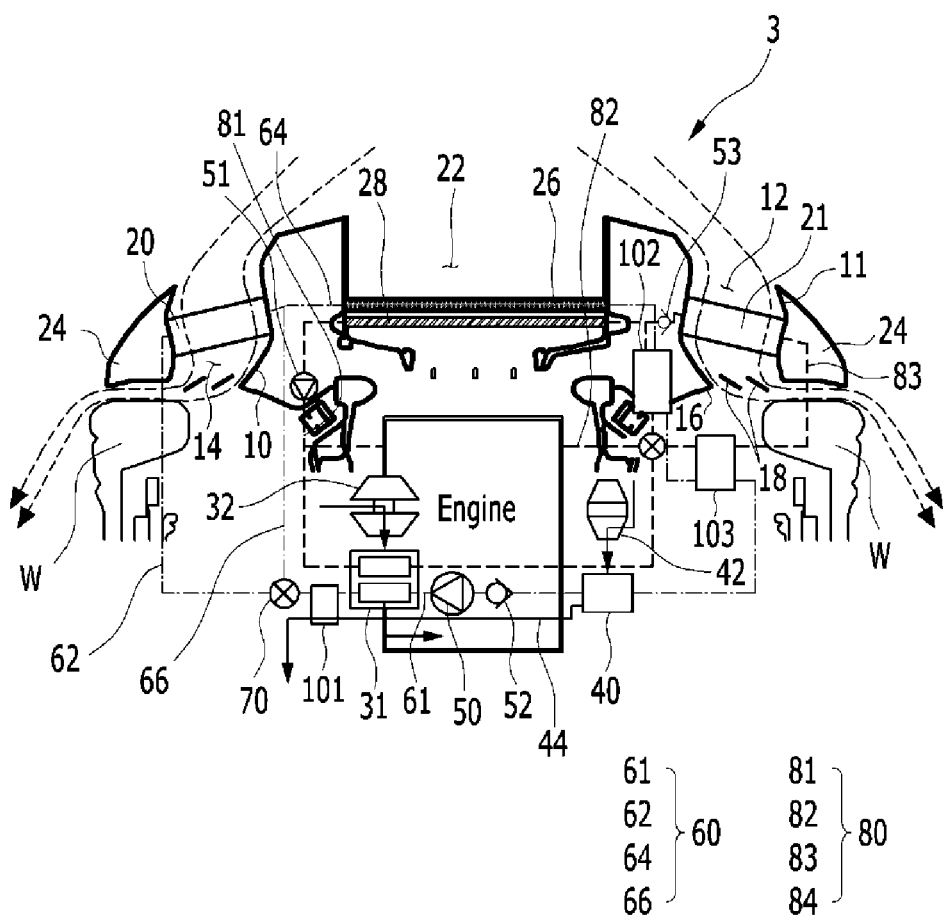
FIG. 11, FIG. 12 and FIG. 13 illustrate operation diagrams of a cooling system according to the other exemplary embodiment of the present invention.
Figure 12:
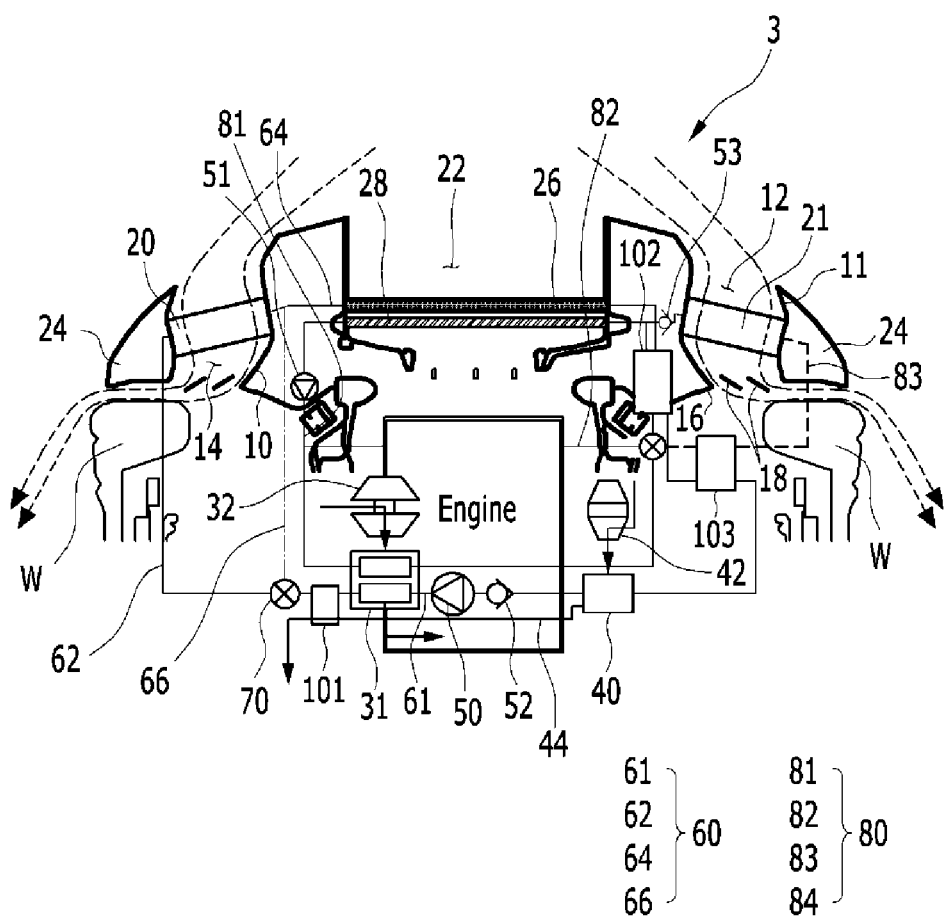

Referring to FIG. 11 to FIG. 12, circulation of coolant which is realized by a cooling system for a vehicle according to the other exemplary embodiment of the present invention will be described in detail.

Figure 13:
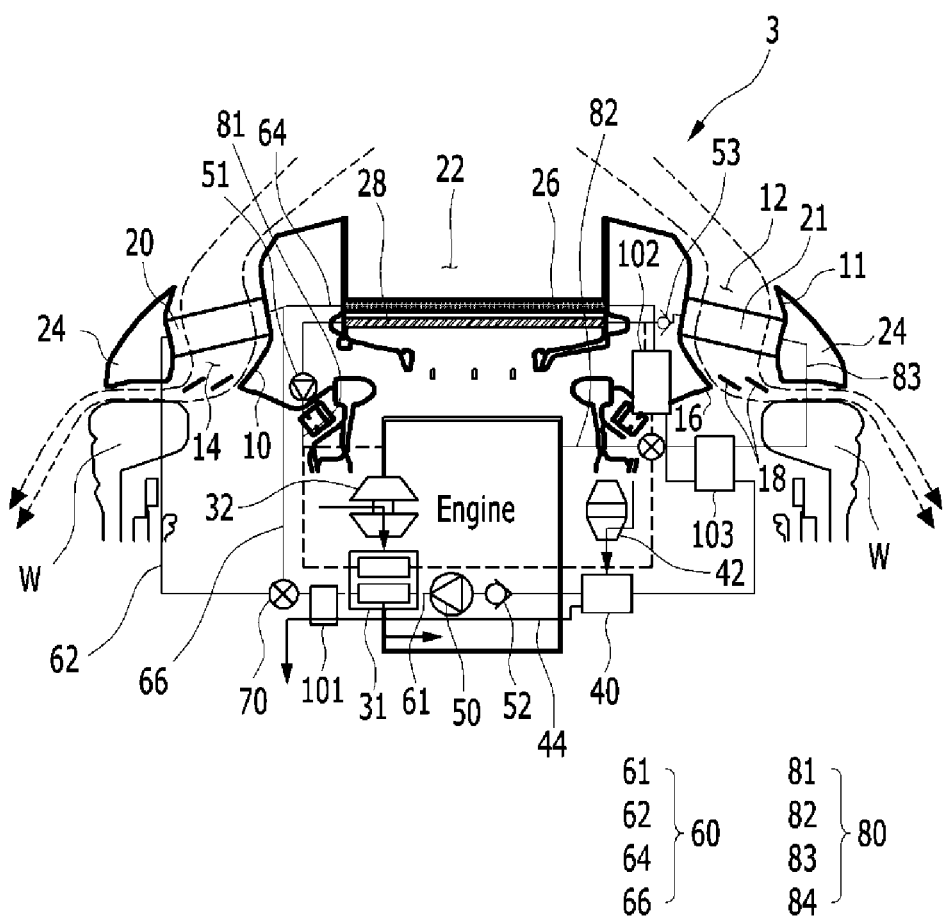

FIG. 11 to FIG. 13 illustrate operation diagrams of a cooling system according to the other exemplary embodiment of the present invention.

As shown in FIG. 11 to FIG. 13, the cooling system 3 according to the other exemplary embodiment of the present invention further includes first, second, and third thermoelectric generators 101, 102, and 103 to compare with the cooling system 2 according to another exemplary embodiment of the present invention cooling system 2. Meanwhile, the repeated descriptions about constituent elements which are same to the description regarding the cooling system 2 according to another exemplary embodiment of the present invention will be omitted in the description regarding the cooling system 3 according to the other exemplary embodiment of the present invention.

Herein, the thermoelectric generation is to perform generation by using phenomenon that current flows if temperature of both contacts are different with each other in a closed circuit including different two kinds of metals, and basic function of the thermoelectric generators 101, 102, and 103 is well-known to a person of an ordinary skill in the art, so a detailed description thereof will be omitted.

The first thermoelectric generator 101 is disposed between the rear intercooler 31 and the first valve 70. In addition, low temperature coolant passing through the rear intercooler 31 flows via the first thermoelectric generator 101. Further, a refrigerant passage 44 which is adapted that refrigerant passing through the rear condenser 40 flows therethrough passes through the first thermoelectric generator 101. That is, the first thermoelectric generator 101 performs the thermoelectric generation by using temperature difference between low temperature coolant passing through the low temperature radiator 26 and refrigerant flowing through the refrigerant passage 44.

The second thermoelectric generator 102 is disposed such that the third low temperature coolant passage 64 and the second high temperature coolant passage 82 are passed therethrough. That is, the second thermoelectric generator 102 performs the thermoelectric generation by using temperature difference between low temperature coolant flowing through the third low temperature coolant passage 64 and high temperature coolant flowing through the second high temperature coolant passage 82.

The third thermoelectric generator 103 is disposed such that the third low temperature coolant passage 64 and the third high temperature coolant passage 83 are passed therethrough. That is, the third thermoelectric generator 103 performs the thermoelectric generation by using temperature difference between low temperature coolant flowing through the third low temperature coolant passage 64 and high temperature coolant flowing through the third high temperature coolant passage 83.

According to an exemplary embodiment of the present invention, aerodynamic performance can be better as the duct outlet 16 is formed such that performance of air passing through the air duct 10 and 11 and forming an air curtain in front of the wheel W is improved. In addition, various designs about circulation of coolant can be realized according to the radiator 20 and 21 being disposed at the air duct 10 and 11. Further, suitable cooling performance to engine E condition can be improved according to circulation of coolant which is variously realized by controlling the valve 70 and 90, and fuel consumption may be better, resultingly.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A cooling system for a vehicle comprising:
    at least two air ducts formed at both side of an exterior air intake port to take in exterior air in front of the vehicle to an engine compartment and configured to take in the exterior air in the front of the vehicle such that the exterior air is flowed out toward a wheel;
    a low temperature radiator disposed at the exterior air intake port and configured to release heat of coolant into the air;
    a high temperature radiator disposed at the exterior air intake port and configured to release heat of coolant into the air;
    an ancillary low temperature radiator disposed inside of one of the at least two air ducts and configured to release heat of coolant into the air;

an ancillary high temperature radiator disposed inside of another one of the at least two air duct and configured to release heat of coolant into the air;

a turbocharger generating compressed air for supplying to an engine;

an intercooler cooling compressed air generated from the turbocharger by using coolant flowed via the low temperature radiator and the high temperature radiator;

a compressor generating compressed refrigerant for supplying to an air conditioner;

a condenser cooling the compressed refrigerant generated from the compressor by using coolant flowed via the low temperature radiator;

a high temperature coolant passage disposed such that coolant passing through the high temperature radiator is circulated to the high temperature radiator via the engine; and a low temperature coolant passage disposed such that coolant passing through the low temperature radiator is passed through the condenser and is circulated again to the low temperature radiator.

2. The cooling system of claim 1, wherein the both rear ducts are gradually more bent to be respectively headed for wheels toward a rear direction of the vehicle.

3. The cooling system of claim 2, wherein a guide plate which guides a direction of air flow such that air flow is guided toward the wheel is provided to duct outlet.

4. The cooling system of claim 3, wherein the guide plate guides a direction of air flow such that air flowed out through the duct outlet forms an air curtain in front of the wheel such that air forming the air curtain in front of the wheel is directed by a set angle.

5. The cooling system of claim 1, wherein a low temperature radiator is disposed between a front duct and a rear duct, and the low temperature radiator is cooled by air flowing via the front duct and the rear duct passes therein.

6. The cooling system of claim 1, wherein coolant flowing via the ancillary low temperature radiator and the ancillary high temperature radiator heat-exchanges with air passing through the air duct in which the ancillary low temperature radiator and the ancillary high temperature radiator are respectively disposed.

7. The cooling system of claim 6, wherein the intercooler and the condenser are disposed near the engine at rearward of the exterior air intake port.

8. The cooling system of claim 6, wherein the low temperature coolant passage comprising:

a first low temperature coolant passage connecting the intercooler with the condenser;

a second low temperature coolant passage connecting the intercooler with the ancillary low temperature radiator;

a third low temperature coolant passage connecting the low temperature radiator with the condenser; and a fourth low temperature coolant passage branched from the third low temperature coolant passage between the ancillary low temperature radiator and the low temperature radiator to be connected with a first valve which is disposed on the second low temperature coolant passage, wherein the first valve controls such that coolant flowing through the fourth low temperature coolant passage via the first low temperature coolant passage selectively flows through the second low temperature coolant passage.

9. The cooling system of claim 6, wherein the high temperature coolant passage comprises:

a first high temperature coolant passage transmitting coolant passing through the high temperature radiator to the engine;

a second high temperature coolant passage transmitting coolant passing through the engine to the high temperature radiator;

a third high temperature coolant passage branched from the second high temperature coolant passage to be connected with the ancillary high temperature radiator and connected again with the second high temperature coolant passage; and a fourth high temperature coolant passage branched from the first high temperature coolant passage and connected on the second high temperature coolant passage via the intercooler.

10. The cooling system of claim 9, wherein a second valve which controls such that coolant flowing through the second high temperature coolant passage is selectively flows through the third high temperature coolant passage is disposed at a portion that the third high temperature coolant passage is branched on the second high temperature coolant passage.

11. The cooling system of claim 10, wherein the second valve is disposed at a portion that the fourth high temperature coolant passage is connected on the second high temperature coolant passage and is operated such that coolant selectively flows through the fourth high temperature coolant passage.

12. The cooling system of claim 1, further comprising at least one thermoelectric generator which performs thermoelectric generation using temperature difference between coolant passing through the low temperature radiator and refrigerant passing through the condenser.

13. The cooling system of claim 12, further comprising at least one thermoelectric generator which performs thermoelectric generation using temperature difference between coolant passing through the low temperature radiator and coolant passing through the high temperature radiator.

14. The cooling system of claim 1, further comprising an air flap which selectively opens/closes the exterior air intake port.

* * * * *